(12) United States Patent
Suzuki et al.

(10) Patent No.: US 11,505,081 B2
(45) Date of Patent: Nov. 22, 2022

(54) CHARGE/DISCHARGE MANAGEMENT APPARATUS AND VEHICLE

(71) Applicant: HONDA MOTOR CO., LTD., Tokyo (JP)

(72) Inventors: Hirofumi Suzuki, Wako (JP); Makoto Ogawa, Wako (JP); Satoshi Odakura, Wako (JP); Daisuke Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 17/003,492

(22) Filed: Aug. 26, 2020

(65) Prior Publication Data

US 2021/0061123 A1   Mar. 4, 2021

(30) Foreign Application Priority Data

Aug. 30, 2019  (JP) .............................. JP2019-158867

(51) Int. Cl.
| | |
|---|---|
| *B60L 53/67* | (2019.01) |
| *H02J 7/02* | (2016.01) |
| *B60L 53/65* | (2019.01) |
| *H02J 7/00* | (2006.01) |
| *B60L 53/66* | (2019.01) |
| *H01M 10/44* | (2006.01) |

(52) U.S. Cl.
CPC .............. *B60L 53/67* (2019.02); *B60L 53/65* (2019.02); *B60L 53/66* (2019.02); *H01M 10/441* (2013.01); *H02J 7/007188* (2020.01); *H02J 7/02* (2013.01); *B60L 2240/72* (2013.01); *H01M 2220/20* (2013.01)

(58) Field of Classification Search
CPC .......... B60L 53/67; B60L 53/65; B60L 53/66; B60L 2240/72; H02J 7/007188; H01M 2220/20
See application file for complete search history.

(56) References Cited

U.S. PATENT DOCUMENTS

| | | | |
|---|---|---|---|
| 10,414,283 B2 | 9/2019 | Kudo et al. | |
| 2014/0361732 A1 | 12/2014 | Nishikawa et al. | |
| 2015/0155720 A1 | 6/2015 | Mise et al. | |

FOREIGN PATENT DOCUMENTS

| | | | | |
|---|---|---|---|---|
| JP | 2011-120327 | | 6/2011 | |
| JP | 2013-179729 | | 9/2013 | |
| JP | 2013179729 | A * | 9/2013 | ........ H01M 10/4207 |
| JP | 2015-106962 | | 6/2015 | |
| JP | 2015106962 | A * | 6/2015 | .......... H01M 10/441 |

(Continued)

OTHER PUBLICATIONS

Machine translation of JP-2013179729-A (Year: 2021).*

(Continued)

*Primary Examiner* — David V Henze-Gongola
(74) *Attorney, Agent, or Firm* — Rankin, Hill & Clark LLP

(57) ABSTRACT

A charge/discharge management apparatus for executing charge/discharge of a battery of a vehicle electrically connected to a facility, comprising an obtaining unit for obtaining use histories of a plurality of batteries corresponding to a plurality of vehicles electrically connected to the facility, and a selection unit for selecting a battery subjected to execution of charge/discharge from the plurality of batteries based on priority decided from the use histories.

5 Claims, 10 Drawing Sheets

(56) References Cited

FOREIGN PATENT DOCUMENTS

JP         6242006     12/2017
JP         6402256      9/2018

OTHER PUBLICATIONS

Machine translation of JP-2015106962-A (Year: 2021).*
Japanese Office Action dated Apr. 9, 2021, partial English translation included, 4 pages.

* cited by examiner

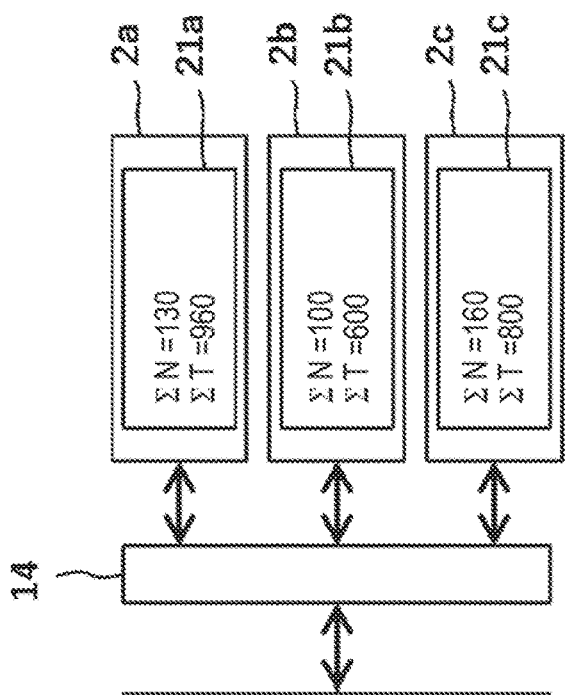
F I G. 7A
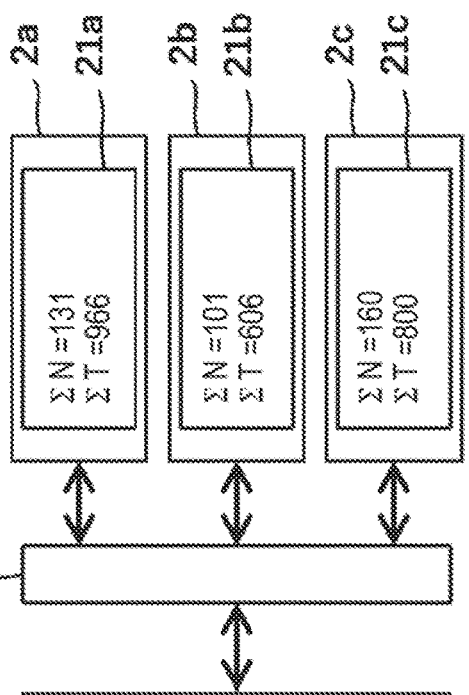
F I G. 7B

| BATTERY | 1ST UTILIZATION | 2ND UTILIZATION | 3RD UTILIZATION | ... | END OF MONTH | BEGIN OF MONTH |
|---|---|---|---|---|---|---|
| 21a | ΣN=0 ΣT=0 | ΣN=1 ΣT=6 | ΣN=2 ΣT=12 | ... | ΣN=5 ΣT=30 | ΣN=1 ΣT=6 |
| 21b | ΣN=0 ΣT=0 | ΣN=1 ΣT=6 | ΣN=1 ΣT=6 | ... | ΣN=5 ΣT=30 | ΣN=1 ΣT=6 |
| 21c | ΣN=0 ΣT=0 | ΣN=0 ΣT=0 | ΣN=1 ΣT=6 | ... | ΣN=4 ΣT=24 | ΣN=0 ΣT=0 |
INITIALIZE
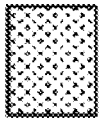 BATTERY TO BE UTILIZED
☐ BATTERY NOT TO BE UTILIZED
F I G. 10

CHARGE/DISCHARGE MANAGEMENT APPARATUS AND VEHICLE

CROSS-REFERENCE TO RELATED APPLICATION(S)

This application claims priority to and the benefit of Japanese Patent Application No. 2019-158867 filed on Aug. 30, 2019, the entire disclosure of which is incorporated herein by reference.

BACKGROUND OF THE INVENTION

Field of the Invention

The present invention mainly relates to a charge/discharge management apparatus for the battery of a vehicle.

Description of the Related Art

While a battery-equipped vehicle such as an electric vehicle stops at a facility such as a home or office, the user can charge the battery of the vehicle using a terminal installed in the facility (see Japanese Patent No. 6242006). The battery can be charged using power (commercial power) from a power system, power generated by a power generator such as a solar power generator, or the like. In this configuration, the battery can be utilized as a storage battery. For example, the battery is discharged based on the demand-and-supply balance of power in a facility. That is, the power of the battery can also be used instead of power from the power system (see Japanese Patent No. 6402256). In general, the battery can shorten its product life along with charge or discharge.

In Japanese Patent Laid-Open No. 2011-120327, the battery of a vehicle subjected to charge is selected from a plurality of vehicles based on the traveling plan of each vehicle or the like in order to decrease the charge count of the battery or prolong the battery life. However, the traveling plan or the like may differ between a plurality of vehicles. According to the method in Japanese Patent Laid-Open No. 2011-120327, the battery of a specific vehicle may be frequently selected as a charge target, leaving room for improvement.

SUMMARY OF THE INVENTION

The present invention enables properly utilizing the respective batteries of a plurality of vehicles electrically connected to a facility.

One of the aspects of the present invention provides a charge/discharge management apparatus for executing charge/discharge of a battery of a vehicle electrically connected to a facility, comprising an obtaining unit for obtaining use histories of a plurality of batteries corresponding to a plurality of vehicles electrically connected to the facility, and a selection unit for selecting a battery subjected to execution of charge/discharge from the plurality of batteries based on priority decided from the use histories.

Further features of the present invention will become apparent from the following description of exemplary embodiments (with reference to the attached drawings).

BRIEF DESCRIPTION OF THE DRAWINGS

FIG. 7A is a view for explaining an example of the utilization form of a plurality of batteries;

FIG. 7B is a view for explaining an example of the utilization form of a plurality of batteries;

FIG. 10 is a table for explaining an example of the utilization form of a plurality of batteries.

DESCRIPTION OF THE EMBODIMENTS

Figure 1:
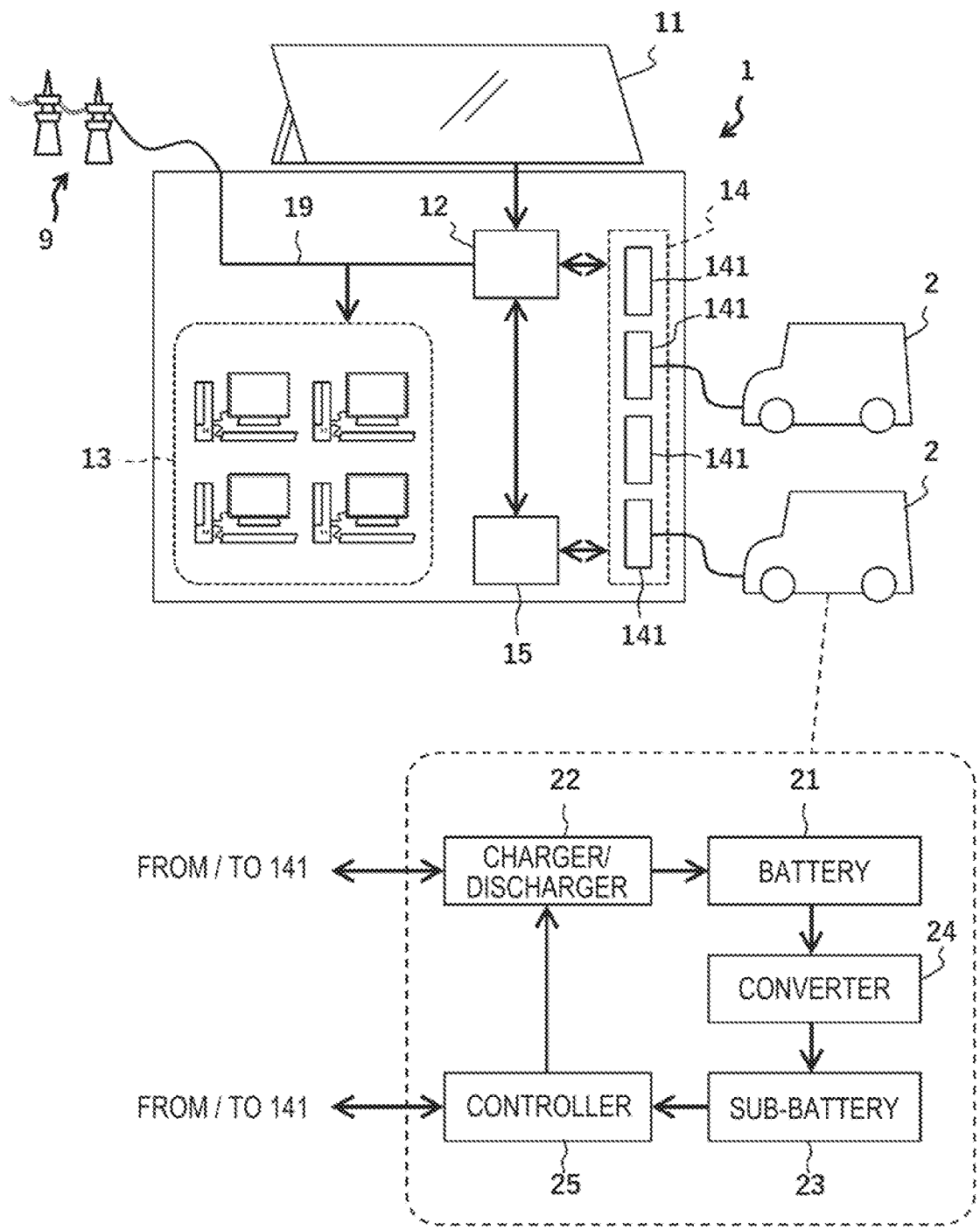
FIG. 1 is a block diagram of the system of a facility in which power management can be executed.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 shows an example of the arrangement of a system for managing power in a facility 1 according to an embodiment. The facility 1 is configured to receive power (commercial power) from a power system 9 and supply power to the power system 9. The facility 1 includes a power generator 11, an inverter 12, an electrical device group 13, a vehicle connection mechanism 14, and a charge/discharge management apparatus 15. To facilitate understanding, the facility 1 is an office building such as a company. As another embodiment, the facility 1 may be a collective housing such as an apartment building, a commercial facility such as a supermarket, or a complex facility of them.

The power system 9 is a system that implements power feeding to each customer (including the facility 1) by performing power generation, power transformation, power transmission, and power distribution. The power system 9 is a concept including a power company, a power plant, a power substation, and a power transmission line. The facility 1 can purchase power from the power system 9, and the power is supplied to a power line 19. The facility 1 can sell power to the power system 9, and the power is supplied from the power line 19 to the power system 9.

The power generator 11 generates another power different from the power of the power system 9. In the embodiment, the power generator 11 is a solar power generator (solar panel) that generates power based on solar light. As another embodiment, for example, the power generator 11 may use another renewable energy such as hydropower, wind power, or geothermal power.

The inverter 12 is also called a power conditioner or the like. The inverter 12 can convert power (for example, DC voltage) obtained by the power generator 11 into power (for example, AC voltage) corresponding to the facility 1, and supply the power to the power line 19.

The electrical device group 13 includes one or more electrical devices that can operate based on the power of the power line 19. FIG. 1 shows a personal computer, a server, and the like as typical examples of the electrical devices. Other examples of the electrical devices are an air conditioner, a refrigerator, a television, and a washing machine. Note that the electrical device group 13 may also be expressed as a power load in the facility or simply as a load or the like.

The vehicle connection mechanism 14 includes a plurality of connection terminals 141 capable of connecting a plurality of vehicles 2 to the facility 1. The above-described inverter 12 can selectively implement bidirectional power supply between the facility 1 and the vehicles 2 via the respective connection terminals 141. More specifically, the inverter 12 includes a converter configured to convert power into corresponding one at the time of power supply between the facility 1 and the vehicle 2, and selectively performs power supply from the power line 19 to the vehicle 2 and power supply from the vehicle 2 to the power line 19. Although the vehicle connection mechanism 14 is illustrated as part of the facility 1 for descriptive convenience, part or all of the vehicle connection mechanism 14 can be installed outside (for example, a parking area).

The power supply from the power line 19 to the vehicle 2 and the power supply from the vehicle 2 to the power line 19 correspond to charge and discharge of a battery 21 (to be described later), respectively. Charge or discharge of the battery 21 will be sometimes simply referred to as charge/discharge.

The charge/discharge management apparatus 15 performs power management in the facility 1 while monitoring the state of the power line 19 via an ammeter or the like. More specifically, the charge/discharge management apparatus 15 designates the above-mentioned power supply between the facility 1 and the vehicle 2 (that is, charge/discharge of the battery) based on the demand-and-supply balance of power in the facility 1. From this viewpoint, the charge/discharge management apparatus 15 may be called a power management apparatus or the like. In the embodiment, the charge/discharge management apparatus 15 can also designate the power supply between the facility 1 and the vehicle 2 based on a request (demand response (DR) request) which is received from the management firm (for example, a power company or a firm (aggregator) that supports power management) of the power system 9 and represents adjustment of the power usage in the facility 1. The DR request may be made by a known communication form such as telephone or mail from the management firm of the power system 9 to the manager of the facility 1, and the demand-and-supply balance may be adjusted accordingly.

The charge/discharge management apparatus 15 includes a CPU (Central Processing Unit), a memory, and a communication interface, and performs the above-described power management based on a predetermined program. The functions of the charge/discharge management apparatus 15 can be implemented by software or hardware. The charge/discharge management apparatus 15 includes a communication device and can implement communication between the facility 1 and the vehicle 2 via the vehicle connection mechanism 14.

Note that the elements in the facility 1 are individually illustrated to discriminate the functions, but are not limited to the arrangement in this example. Some elements may be constituted by a single unit, or a given element may be constituted by a plurality of units. For example, the inverter 12 and the charge/discharge management apparatus 15 may be constituted by a single unit, or some functions of the vehicle connection mechanism 14 may be implemented by the inverter 12.

The vehicle 2 is an electric vehicle (EV) including the battery 21 in the embodiment, and further includes a charger/discharger 22, a sub-battery 23, a converter 24, and a controller 25. The battery 21 is, for example, a lithium ion battery of about 200-V output voltage. The charger/discharger 22 includes a bidirectional inverter and a relay, and can selectively execute bidirectional power supply between the facility 1 and the vehicle 2 by electrically connecting the vehicle 2 to the facility 1 by the vehicle connection mechanism 14. For example, the charger/discharger 22 supplies the power of the power line 19 to the battery 21 (charges the battery 21), or supplies the power of the battery 21 to the power line 19 (discharges the battery 21).

The sub-battery 23 can be, for example, a lead storage battery of about 12-V output voltage. The converter 24 can convert the power of the battery 21 into one corresponding to the sub-battery 23 and charge the sub-battery 23. That is, the sub-battery 23 receives and stores power from the battery 21.

Secondary batteries are used as the battery 21 and the sub-battery 23. The main function of the battery 21 is a power source for driving the power source (for example, an electric motor such as a three-phase induction motor) of the vehicle 2. The main function of the sub-battery 23 is an auxiliary power source for driving the electrical system (for example, the controller 25 to be described later) of the vehicle 2. The battery 21 may be referred to as a main battery to discriminate it from the sub-battery 23.

In the embodiment, the sub-battery 23 can be charged by the power of the battery 21 while the charger/discharger 22 executes charge of the battery 21. As another embodiment, the sub-battery 23 may be chargeable by the power of the battery 21 while the vehicle 2 travels. This is preferable when the vehicle 2 is a so-called hybrid car.

The controller 25 operates based on the power of the sub-battery 23, communicates with the charge/discharge management apparatus 15, and controls driving of the charger/discharger 22. For example, the controller 25 in the operating state controls driving of the charger/discharger 22 based on a signal from the charge/discharge management apparatus 15, thereby charging/discharging the battery 21. While the charge/discharge of the battery 21 is not performed, the controller 25 stands still (substantially does not operate).

In the embodiment, the electrical connection between the facility 1 and the vehicle 2 is implemented by a single cable serving as the connection terminal 141 in the vehicle connection mechanism 14. This implements both the electrical connection between the power line 19 and the battery 21 via the charger/discharger 22 and the communication between the charge/discharge management apparatus 15 and the controller 25.

The system of the facility 1 can properly manage power in the facility 1 based on the demand-and-supply balance. From another viewpoint, a power amount purchased from the power system 9 can be reduced or suppressed by utilizing the battery 21 of the vehicle 2 electrically connected to the facility 1. Further, transmitting power to the power system 9 can contribute to power stabilization. For example, when the demand for power in the facility 1 is higher than the supply, the battery 21 is discharged. When the demand for power in the facility 1 is lower than the supply, the battery 21 is charged or power is transmitted to the power system 9. The system of the facility 1 can also be called a V2H (Vehicle to Home) control system, a V2G (Vehicle to Grid) control system, or the like. In the following description, execution of charge/discharge of the battery 21 based on the demand-and-supply balance will also be simply referred to as utilization of the battery 21.

In the system of the facility 1, after the vehicle 2 is electrically connected to the facility 1 so that the battery 21 can be utilized as described above, the vehicle 2 may need to be used against the prediction of the user (regardless of the schedule of the user). Considering this, the user can set as a target range (target range RO) in advance a range that should be satisfied by the charging rate of the battery 21. The battery 21 can therefore be utilized appropriately while the vehicle 2 is electrically connected to the facility 1. That is, while the charging rate of the battery 21 is maintained within the target range RO, bidirectional power supply between the facility 1 and the vehicle 2 can be selectively performed. The charging rate represents the ratio of the remaining capacity to the battery capacity of the battery 21 and can also be expressed as SOC (State Of Charge). The target range RO may be set to any region from a charging rate of 0% to 100% and can be set to, for example, 20% (lower limit value) to 80% (upper limit value).

Figure 2:
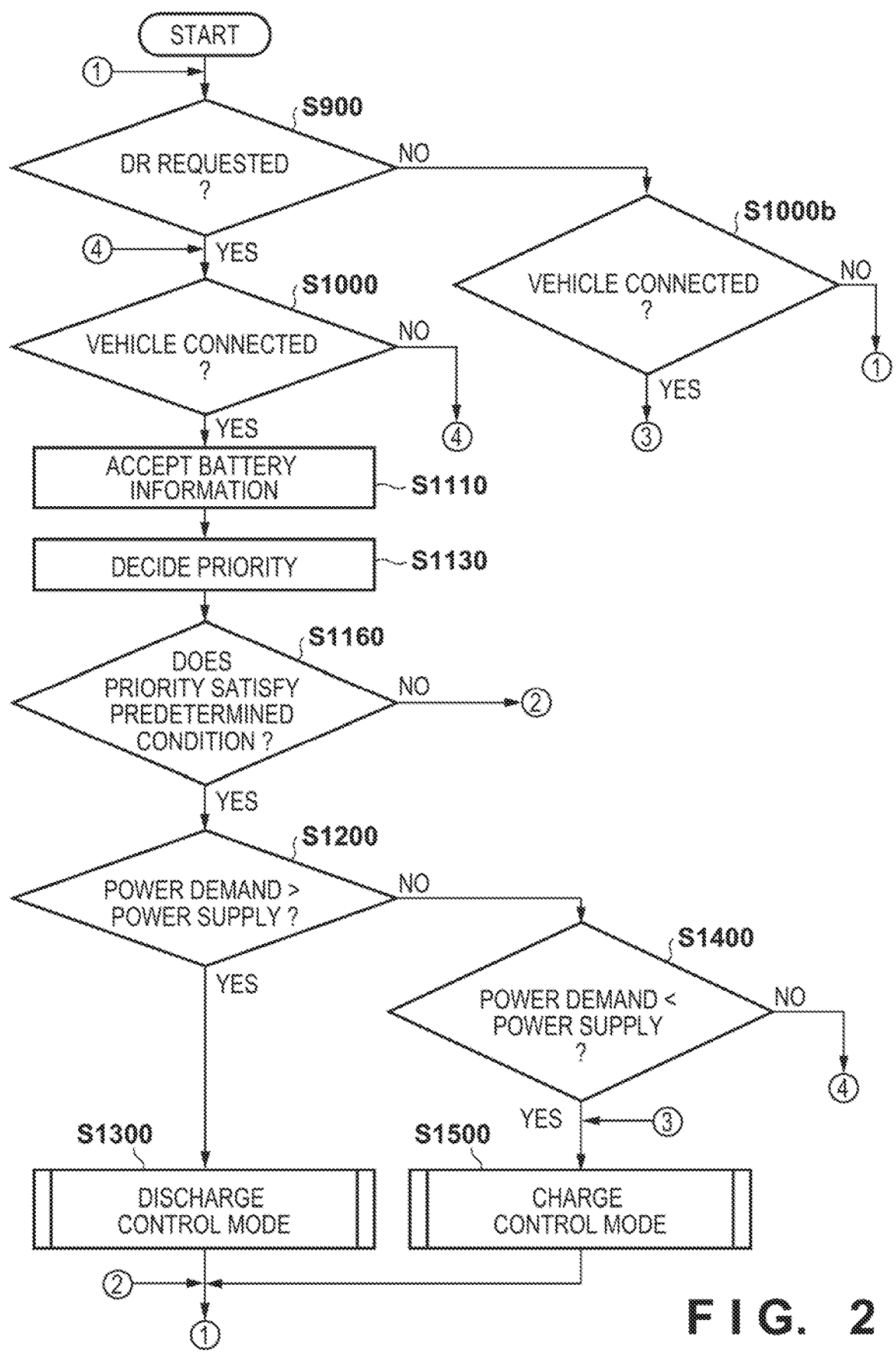
FIG. 2 is a flowchart for explaining an example of a battery utilization method.

FIG. 2 is a flowchart showing a method of utilizing the battery 21 by the charge/discharge management apparatus 15, that is, the charge/discharge management method of the battery 21. The general outline is to, when a plurality of vehicles 2 are electrically connected to the facility 1, set priority for selecting the battery 21 to be utilized from the batteries 21 corresponding to the respective vehicles 2, and selectively utilize the batteries 21 based on the priority. The charge/discharge management apparatus 15 mainly implements steps to be described below.

In step S900 (simply referred to as "S900" hereinafter; this also applies to the remaining steps to be described later), it is determined whether the facility 1 has received the above-mentioned DR request from the power system 9. This determination is made based on whether the facility 1 has received a request from the management firm of the power system 9 to adjust the power amount (unit [kWh]) and/or frequency (unit [Hz]). If the DR request has been received, the process advances to S1000; otherwise, to S1000b.

In S1000, it is determined whether the electrical connection between the facility 1 and the vehicle 2 has been implemented (see FIG. 1). This determination is made based on whether the vehicle 2 has been connected to at least one connection terminal 141 in the vehicle connection mechanism 14. By the electrical connection between the facility 1 and the vehicle 2, the power line 19 and the battery 21 is electrically connected via the charger/discharger 22, and the charge/discharge management apparatus 15 and the controller 25 can communicate with each other. If the electrical connection between the facility 1 and the vehicle 2 has been implemented, the process advances to S1100; otherwise, returns to S1000.

In S1000b, similar to S1000, it is determined whether the electrical connection between the facility 1 and the vehicle 2 has been implemented. If the electrical connection between the facility 1 and the vehicle 2 has been implemented, the process advances to S1500; otherwise, returns to S900.

Note that the branch to S1000b means that the power generator 11, the inverter 12, the vehicle connection mechanism 14, and the charge/discharge management apparatus 15 also function as a charger for the vehicle. This function charges the vehicle until the charging rate reaches the upper limit of the target range RO at an estimated time when the user cancels the connection by the connection terminal 141, regardless of the presence/absence of the DR request. A travelable distance of the vehicle can be ensued satisfactorily.

In S1100, information about the battery 21 is accepted/received from the controller 25 by the communication between the charge/discharge management apparatus 15 and the controller 25, and the information is stored in the memory of the charge/discharge management apparatus 15. Examples of the information from the controller 25 are identification information of the battery 21, information representing the charging rate of the battery 21, information representing the utilization allowable range of the battery 21, and information representing the use history of the battery 21.

The identification information of the battery 21 can be used to specify the battery 21 to be utilized. The information representing the charging rate of the battery 21 represents the ratio of the remaining capacity to the battery capacity of the battery 21 at that time (in this case, when the facility 1 and the vehicle 2 are electrically connected). The information representing the utilization allowable range of the battery 21 represents the above-described target range RO that should be satisfied by the charging rate of the battery 21 when utilizing the battery 21. Here, the user can set the target range RO in advance.

The information representing the use history of the battery 21 represents a way (for example, power amount and frequency) in which the power of the battery 21 has been used so far, that is, the use record of the battery 21. Examples of the information are the power amount used to drive the power source and the use time when the vehicle 2 travels, and the utilization form (for example, power amount, frequency, and time of charge/discharge) of the battery 21 when the vehicle 2 does not travel, details of which will be described later. From this viewpoint, the use history or the use record represents the degree of past burden on the battery 21.

In S1130, the priority (parameter for determining the order of utilization; to be sometimes simply referred to as "priority" for descriptive convenience) of the battery 21 to be utilized is decided based on the information representing the use history of the battery 21. The priority can be decided based on the past use count and use time of the battery 21 and collaterally the durability of the battery 21, details of which will be described later.

In S1160, it is determined whether the priority decided in S1130 satisfies a predetermined condition. If the priority satisfies the predetermined condition, the process advances to S1200; otherwise, returns to S900. For example, when the priority of a given battery 21 is relatively low and the number of batteries 21 to be utilized is small in terms of the demand-and-supply balance of power in the facility 1, the given battery 21 is not utilized, details of which will be described later. When the number of batteries 21 to be utilized is large, the given battery 21 can be utilized even if its priority is relatively low.

In S1200, the demand-and-supply balance of power in the facility 1 including a power demand by the DR request is determined. This determination may be made by monitoring the state of the power line 19 via an ammeter or the like. Here, it is determined whether the demand for power in the facility 1 is higher than the supply. The demand represents the power consumption by the electrical device group 13, and the suppressed power or received power of the power system 9 based on the DR request. The supply represents power generated by the power generator 11 and power transmitted from the power system 9 based on the DR request. If the demand for power in the facility 1 is higher than the supply, the process advances to S1300; otherwise, to S1400.

In S1300, the operation mode of the charge/discharge management apparatus 15 is changed to the discharge control mode. The battery 21 is discharged in accordance with the determination in S1200 that the demand for power in the facility 1 is higher than the supply (the power of the battery 21 compensates for a shortage of power in the facility 1), details of which will be described later.

In S1400, the demand-and-supply balance of power in the facility 1 is further determined. It suffices to perform this determination similarly to S1200. Here, it is determined whether the demand for power in the facility 1 is lower than the supply. If the demand is lower than the supply, the process advances to S1500; otherwise, returns to S1000.

In S1500, the operation mode of the charge/discharge management apparatus 15 is changed to the charge control mode. The battery 21 is charged in accordance with the determination in S1400 that the demand for power in the facility 1 is lower than the supply (surplus of power in the facility 1 is supplied to the battery 21), details of which will be described later.

That is, S1200, S1300, S1400, and S1500 are steps in which the utilization of the battery 21 of the vehicle 2 by the charge/discharge management apparatus 15 is implemented. Note that S1200 and S1400 are discriminated for descriptive convenience, but may be performed almost simultaneously.

Although not described above, the flowchart ends before an estimated time when the user uses the vehicle 2, and the battery 21 can be charged to a desired charging rate.

Figure 3:
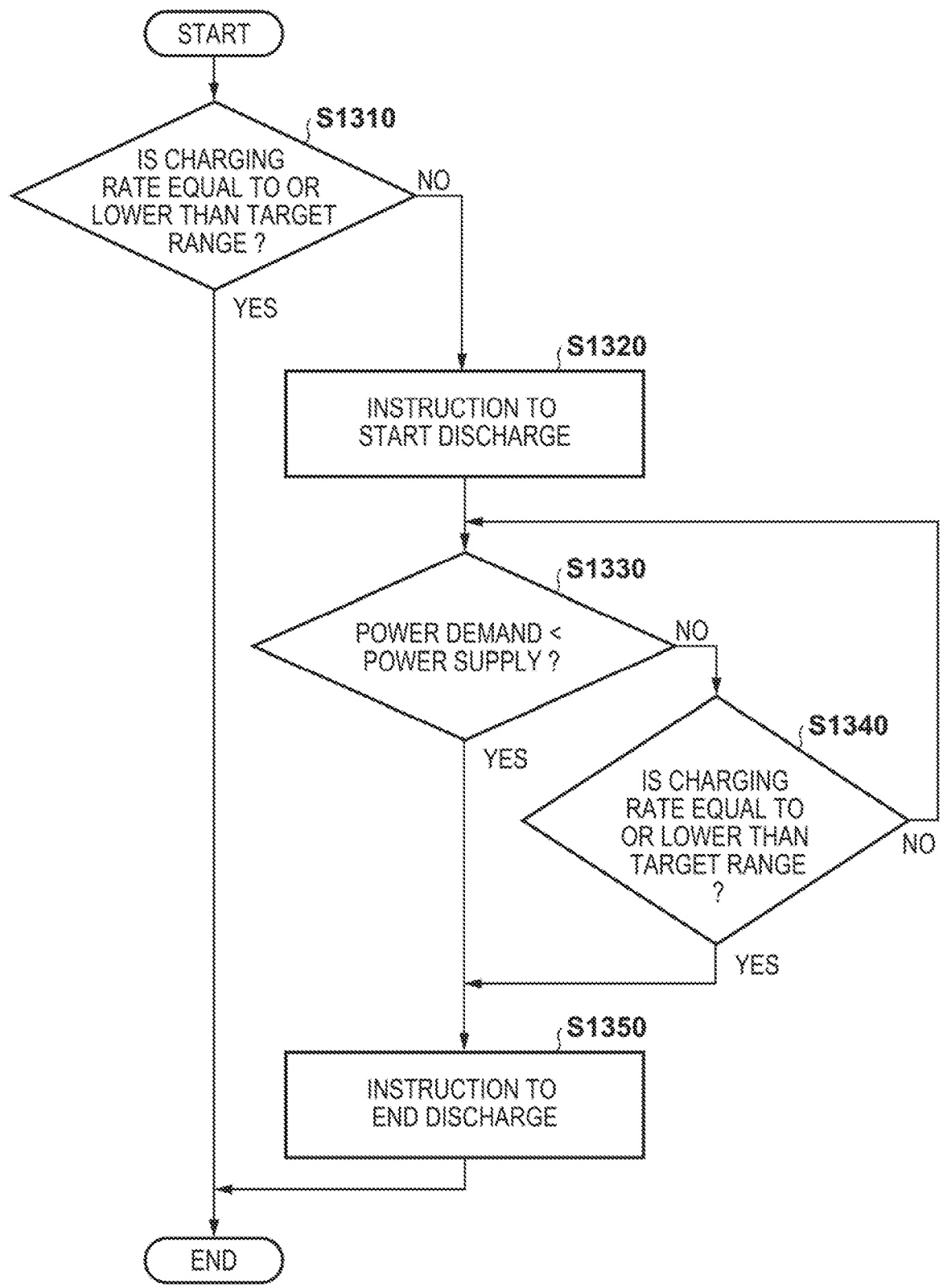
FIG. 3 is a flowchart for explaining discharge of a battery.

FIG. 3 is a flowchart showing a control method in the discharge control mode (see S1300) of the charge/discharge management apparatus 15. The general outline is to obtain information (see S1100) of the battery 21 stored in the memory of the charge/discharge management apparatus 15, and issue an instruction to start discharge from the battery 21 based on the charging rate of the battery 21, or suppress the instruction.

In S1310, it is determined whether the charging rate of the battery 21 stored in the memory of the charge/discharge management apparatus 15 is equal to or lower than the above-described target range RO (equal to or lower than the lower limit value of the target range RO). For example, immediately after the vehicle 2 is electrically connected to the facility 1, the charging rate of the battery 21 stored in the memory of the power management apparatus 15 in S1100 is referred to and it is determined whether the stored charging rate is equal to or lower than the lower limit value of the target range RO. If the stored charging rate of the battery 21 is equal to or lower than the lower limit value of the target range RO, the flowchart ends (returns to S900 in FIG. 2 without suppressing an instruction to start discharge of the battery 21 or issuing the instruction); otherwise, advances to S1320.

In S1320, an instruction to start discharge of the battery 21 is issued, that is, an instruction to start power supply from the battery 21 of the vehicle 2 to the power line 19 of the facility 1 is issued. The discharge of the battery 21 starts by operating the controller 25 based on the power of the sub-battery 23 and controlling driving of the charger/discharger 22 by the controller 25 in the operating state. By the discharge, the power of the battery 21 compensates for a shortage of power in the facility 1.

In S1330, it is determined whether the demand for power in the facility 1 becomes lower than the supply (the demand-and-supply balance of power in the facility 1 has been reversed). If the demand becomes lower than the supply, the process advances to S1350; otherwise, to S1340.

In S1340, it is determined whether the charging rate of the battery 21 becomes equal to or lower than the lower limit value of the target range RO. This determination is made by obtaining the current charging rate (charging rate at that time) of the battery 21 from the controller 25 in the operating state by communication between the power management apparatus 15 and the controller 25. If the charging rate of the battery 21 becomes equal to or lower than the lower limit value of the target range RO, the process advances to S1350; otherwise, returns to S1330.

In S1350, an instruction to end the discharge of the battery 21 is issued, that is, an instruction to end the power supply from the battery 21 of the vehicle 2 to the power line 19 of the facility 1 is issued. Then, the flowchart ends (returns to S900 in FIG. 2). The charging rate of the battery 21 at that time is stored in the memory of the power management apparatus 15 (information stored in the memory is updated).

Figure 4:
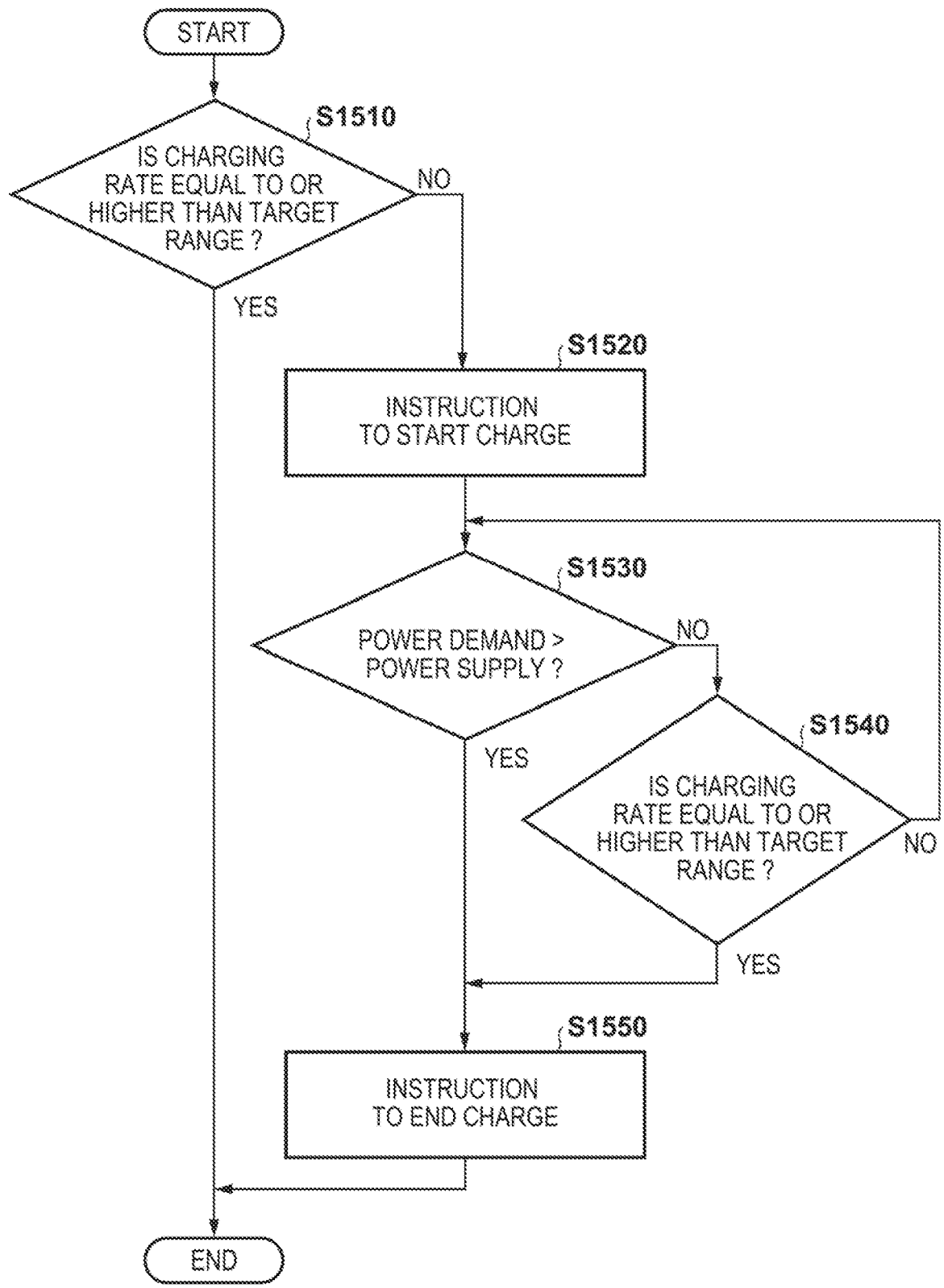
FIG. 4 is a flowchart for explaining charge of the battery.

FIG. 4 is a flowchart showing a control method in the charge control mode (see S1500) of the charge/discharge management apparatus 15. The general outline is to obtain information of the battery 21 stored in the memory of the charge/discharge management apparatus 15, and issue an instruction to start charge from the battery 21 based on the charging rate of the battery 21, or suppress the instruction.

In S1510, it is determined whether the charging rate of the battery 21 stored in the memory of the charge/discharge management apparatus 15 is equal to or higher than the above-described target range RO (equal to or higher than the upper limit value of the target range RO). For example, immediately after the vehicle 2 is electrically connected to the facility 1, the charging rate of the battery 21 stored in the memory of the power management apparatus 15 in S1100 is referred to and it is determined whether the stored charging rate is equal to or higher than the upper limit value of the target range RO. If the stored charging rate of the battery 21 is equal to or higher than the upper limit value of the target range RO, the flowchart ends (returns to S900 in FIG. 2 without suppressing an instruction to start charge of the battery 21 or issuing the instruction); otherwise, advances to S1520.

In S1520, an instruction to start charge of the battery 21 is issued, that is, an instruction to start power supply from the power line 19 of the facility 1 to the battery 21 of the vehicle 2 is issued. The charge of the battery 21 starts by operating the controller 25 based on the power of the sub-battery 23 and controlling driving of the charger/discharger 22 by the controller 25 in the operating state. By the charge, a surplus of power in the facility 1 is supplied to the battery 21.

In S1530, it is determined whether the demand for power in the facility 1 becomes higher than the supply (the demand-and-supply balance of power in the facility 1 has been reversed). If the demand becomes higher than the supply, the process advances to S1550; otherwise, to S1540.

In S1540, it is determined whether the charging rate of the battery 21 becomes equal to or higher than the upper limit value of the target range RO. This determination is made by obtaining the current charging rate of the battery 21 from the controller 25 in the operating state by communication between the power management apparatus 15 and the controller 25. If the charging rate of the battery 21 becomes equal to or higher than the upper limit value of the target range RO, the process advances to S1550; otherwise, returns to S1530.

In S1550, an instruction to end the charge of the battery 21 is issued, that is, an instruction to end the power supply from the power line 19 of the facility 1 to the battery 21 of the vehicle 2 is issued. Then, the flowchart ends (returns to S900 in FIG. 2). The charging rate of the battery 21 at that time is stored in the memory of the power management apparatus 15 (information stored in the memory is updated).

In this manner, the charge/discharge management apparatus 15 manages power in the facility 1 by utilizing the battery 21 based on the demand-and-supply balance of power in the facility 1 and a request (that is, DR request) from the power system 9 to adjust the power usage, and can meet the DR request.

In short, when one or more vehicles 2 are electrically connected to the facility 1 (S1000), the charge/discharge management apparatus 15 receives information of each battery 21 from the controller 25 and stores it in the memory (S1100). Then, the charge/discharge management apparatus 15 causes the controller 25 and the charger/discharger 22 to execute charge/discharge of the battery 21 based on the information, and utilizes the battery 21 while maintaining the charging rate of the battery 21 within the target range RO (S1200, S1300, S1400, and S1500).

Although the facility 1 assumes an office in the above description, the system of the facility 1 can be alternatively/collaterally used as a service regarding the utilization of the battery 21. For example, the user (owner or driver of the vehicle 2 or parties concerned) of the vehicle 2 can start the use of this service at a timing he/she wants. An incentive (for example, money or an equivalent coupon or point) corresponding to a utilization form can be given to the user of the vehicle 2 corresponding to the battery 21 to be utilized.

In a state in which a plurality of vehicles 2 are electrically connected to the facility 1 in the same period, the batteries 21 of not all but some of the vehicles 2 may be utilized depending on the demand-and-supply balance of power in the facility 1.

For example, a state in which four vehicles 2 are electrically connected to the facility 1 is a state in which four batteries 21 corresponding to the four vehicles 2 can be utilized. When the demand for power in the facility 1 is higher than the supply and the difference between them is relatively large, discharge from all the four batteries 21 can be required. When the demand for power in the facility 1 is lower than the supply and the difference between them is relatively large, charge of all the four batteries 21 can be required.

However, when the demand for power in the facility 1 is higher than the supply and the difference between them is relatively small, discharge from some (for example, one to three) of the four batteries 21 can be required. When the demand for power in the facility 1 is lower than the supply and the difference between them is relatively small, charge of some of the four batteries 21 can be required. In this case, the burden is localized on only specific batteries of the four batteries 21, and the product life of the specific batteries may be shortened. To prevent this, the batteries 21 to be utilized (to be charged/discharged) need to be properly selected.

Figure 5A:
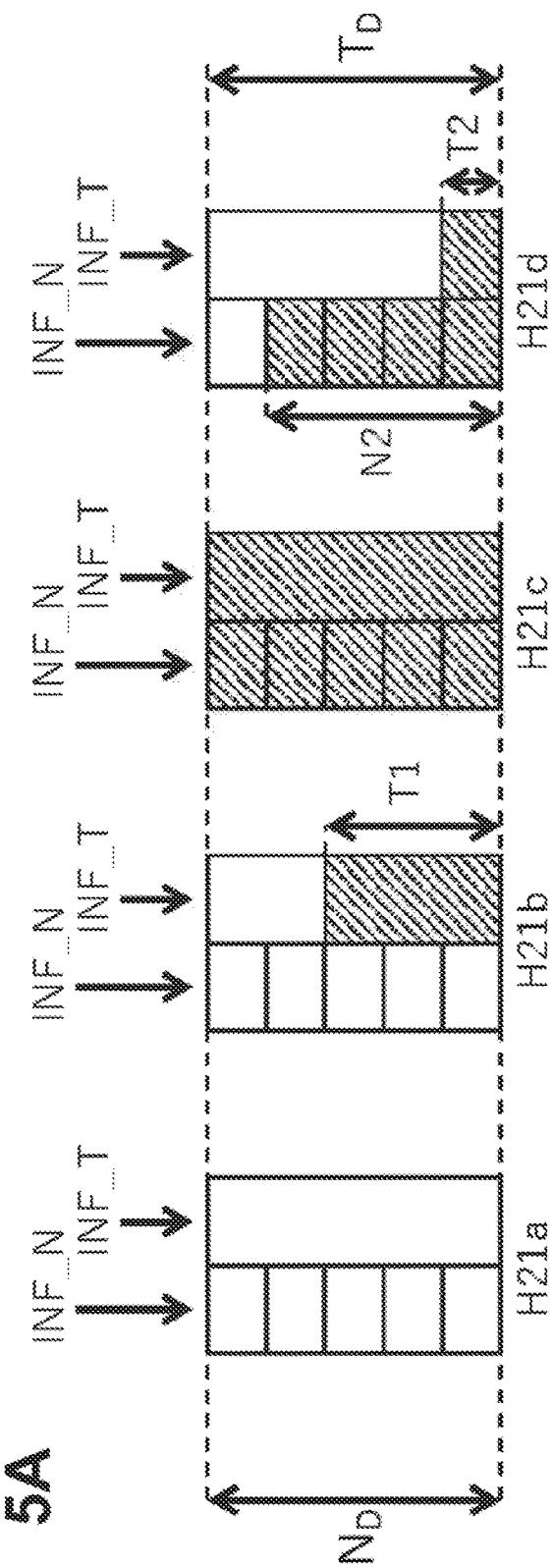
FIG. 5A is a view for explaining an example of the utilization form of a plurality of batteries.

FIG. 5A shows use histories H21a to H21d of the four batteries 21 (to be referred to as 21a to 21d distinctively) as a reference example. To facilitate understanding, all the four batteries 21a to 21d are assumed to be substantially unused (new) batteries purchased at substantially the same time. Each of the use histories H21a to H21d includes information INF_N and information INF_T.

The information INF_N represents the use count of the battery 21, and the use count can be defined by contents that are different depending on the type of the battery 21, the manufacturer, and the like. For example, the use count indicates the discharge count for driving the driving source when the vehicle 2 travels, and the charge count and/or discharge count when the vehicle 2 does not travel.

The information INF_T represents the use time of the battery 21, and the use time can be defined by contents that are different depending on the type of the battery 21, the manufacturer, and the like. For example, the use time indicates the discharge time for driving the driving source when the vehicle 2 travels, and the charge time and/or discharge time when the vehicle 2 does not travel.

Note that the use of the battery 21 in this specification means the use that may influence the product life of the battery 21 serving as a storage battery, and is a concept including driving of the power source (that is, discharge of the battery 21) when the vehicle 2 travels, and the utilization of the battery 21 (that is, charge/discharge of the battery 21) when the vehicle 2 does not travel. From this viewpoint, the use count may be expressed as the activation count, the charge/discharge count, or the like, and the use time may be expressed as the operating time, the charge/discharge time, or the like.

In FIG. 5A, an upper limit value $N_D$ of the use count is, for example, five times for each of the batteries 21a to 21d for descriptive convenience, and an upper limit value $T_D$ of the use time is five hours.

In the use history H21a of the battery 21a, the information INF_N represents that the use count is five times (remaining count is 0 time), and the information INF_T represents that the use time is five hours (remaining time is 0 hour). That is, the use history H21a represents that the use count and use time of the battery 21a have reached the upper limit values $N_D$ and $T_D$, respectively, and the battery 21a cannot be utilized.

In the use history H21b of the battery 21b, the information INF_N represents that the use count is five times (remaining count is 0 time), and the information INF_T represents that the use time is two hours (remaining time is three hours (=T1)). That is, the use history H21b represents that the use count of the battery 21b has reached the upper limit value $N_D$ and the battery 21b cannot be utilized.

In the use history H21c of the battery 21c, the information INF_N represents that the use count is 0 time (remaining count is five times (=$N_D$)), and the information INF_T represents that the use time is 0 hour (remaining time is five hours (=$T_D$)). That is, the use history H21c represents that the battery 21c is substantially unused and can be utilized.

In the use history H21d of the battery 21d, the information INF_N represents that the use count is one time (remaining count is four times (=N2)), and the information INF_T represents that the use time is four hours (remaining time is one hour (=T2)). That is, the use history H21d represents that the use count and use time of the battery 21d have not reached the upper limit values $N_D$ and $T_D$, respectively, and the battery 21d can be utilized.

That is, the example in FIG. 5A represents that the burden is localized on the batteries 21a and 21b out of the four batteries 21a to 21d and as a result, the product lives of the batteries 21a and 21b expire ahead of the batteries 21c and 21d. This is because time periods in which the four vehicles 2 (to be referred to as 2a to 2d distinctively) corresponding to the four batteries 21a to 21d are electrically connected to the facility 1 can differ from each other, and use forms (for example, driving operation by the driver, purpose, and traveling route) can differ from each other. This may occur even when the four batteries 21a and 21d are new batteries purchased as at substantially the same time, and may impair the fairness between the users of the vehicles 2a to 2d.

Figure 5B:
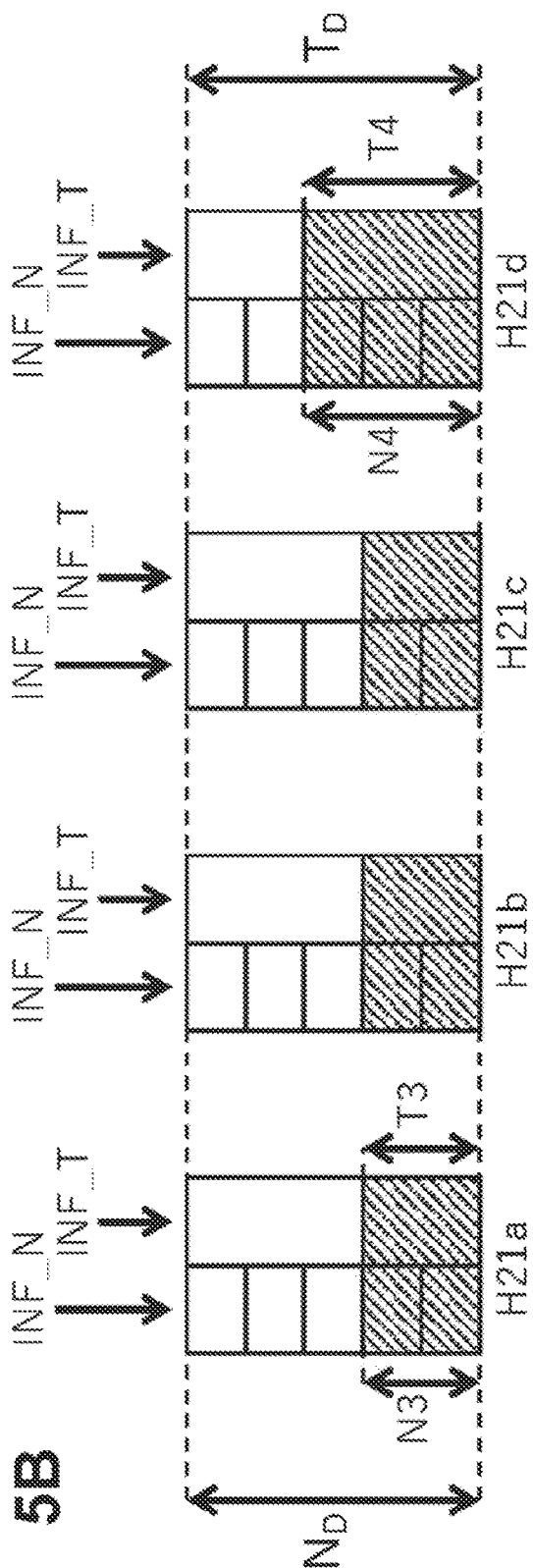
FIG. 5B is a view for explaining an example of the utilization form of a plurality of batteries.

FIG. 5B shows the use histories H21a to H21d of the four batteries 21a to 21d as an ideal example, similar to FIG. 5A. As is apparent from a comparison between FIGS. 5A and 5B, the sums of use counts and use times of the batteries 21a to 21d shown in FIG. 5B are similar to those in FIG. 5A.

In the use history H21a of the battery 21a, the information INF_N represents that the use count is three times (remaining count is two times (=N3)), and the information INF_T represents that the use time is three hours (remaining time is two hours (=T3)). That is, the use history H21a represents that the use count and use time of the battery 21a have not reached the upper limit values $N_D$ and $T_D$, respectively, and the battery 21a can be utilized. This also applies to the use history H21b of the battery 21b and the use history H21c of the battery 21c.

In the use history H21d of the battery 21d, the information INF_N represents that the use count is two times (remaining count is three times (=N4)), and the information INF_T represents that the use time is two hours (remaining time is three hours (=T4)). That is, the use history H21d represents that the use count and use time of the battery 21d have not reached the upper limit values $N_D$ and $T_D$, respectively, and the battery 21d can be utilized.

That is, the example in FIG. 5B represents that the sums of use counts and use times of the batteries 21a to 21d are similar to those in FIG. 5A, but the batteries 21a to 21d are so utilized as not to generate a difference in burden between the batteries 21a to 21d, so all the batteries 21a to 21d can be utilized. Several embodiments will be described below as concrete examples of the utilization method of the battery 21 for implementing this.

First Embodiment

Figure 6:
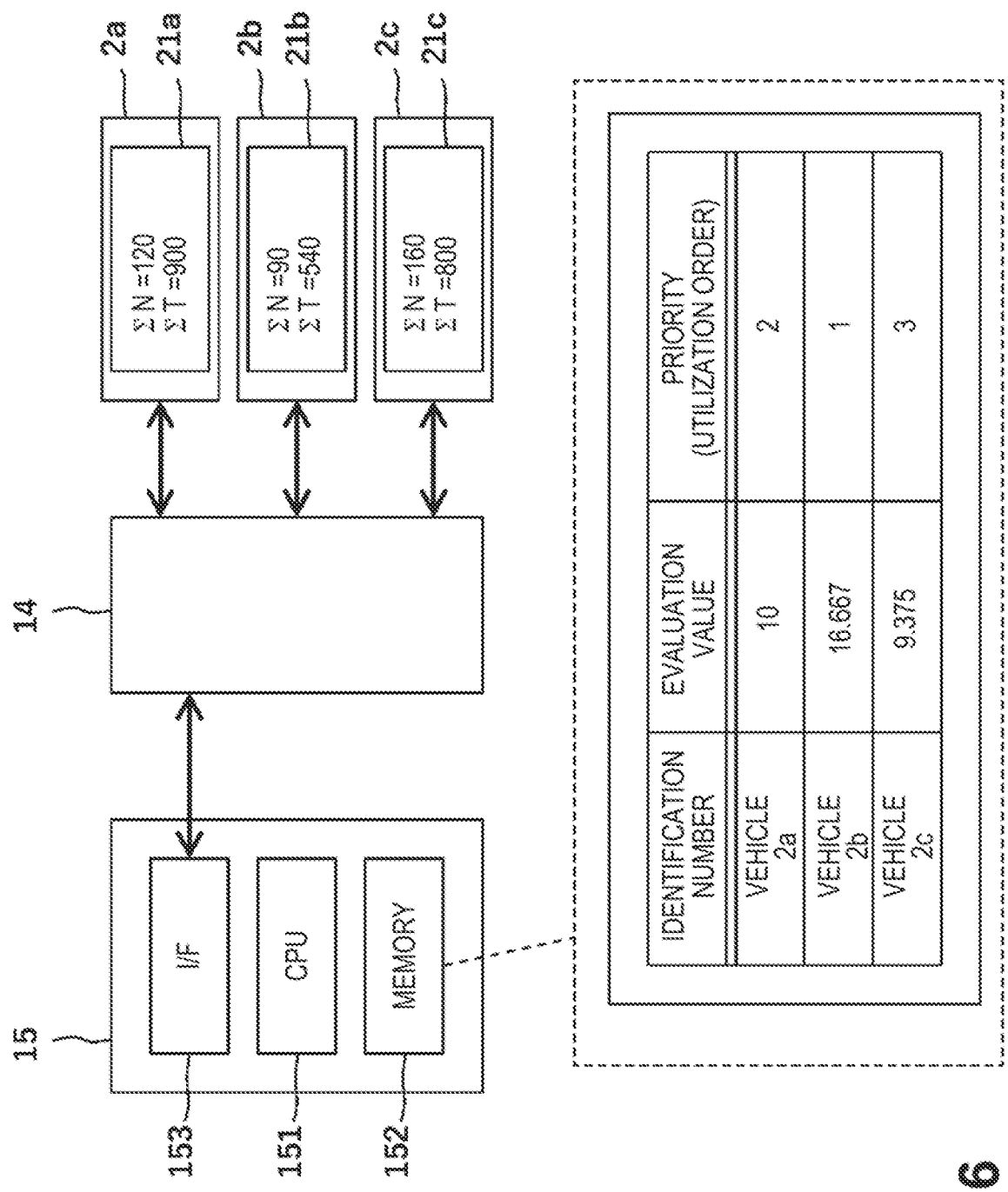
FIG. 6 is a view for explaining an example of the utilization form of a plurality of batteries.

FIG. 6 shows an example of the utilization form of a plurality of batteries 21 as the first embodiment. In this case, three vehicles 2a to 2c are electrically connected to a facility 1, and three batteries 21a to 21c corresponding to the vehicles 2a to 2c can be utilized.

For descriptive convenience, all the batteries 21a to 21c are assumed to have similar specifications. That is, the durabilities of the batteries 21a to 21c, in this case, an upper limit value $N_D$ of the use count and an upper limit value $T_D$ of the use time are assumed to be equal between the batteries 21a to 21c. For example, $N_D$=1500 times
$T_D$=9000 hours A charge/discharge management apparatus 15 includes a CPU 151, a memory 152, and a communication interface 153. The charge/discharge management apparatus 15 receives information INF_N and information INF_T as information representing use histories H21a to H21c from the respective batteries 21a to 21c via the communication interface 153 (see S1100 in FIG. 2). The information INF_N represents the use count (accumulated value of use counts; to be referred to as a use count $\Sigma N$) of the corresponding battery 21. The information INF_T represents the use time (accumulated value of use times; to be referred to as a use time $\Sigma T$) of the corresponding battery 21.

In the embodiment, as shown in FIG. 6, as for the battery 21a, $\Sigma N$=120 times
$\Sigma T$=900 hours as for the battery 21b, $\Sigma N$=90 times
$\Sigma T$=540 hours as for the battery 21c, $\Sigma N$=160 times
$\Sigma T$=800 hours The charge/discharge management apparatus 15 performs predetermined calculation processing on the memory 152 by the CPU 151 based on the received information INF_N and information INF_T, thereby deciding priority (see S1130 in FIG. 2). The priority can be decided based on an evaluation value (to be referred to as an evaluation value V) using the above-mentioned $N_D$, $T_D$, $\Sigma N$, and ET. The evaluation value V can be calculated by, for example, $$1/V = \mathrm{Max}\{a \times \Sigma N/N_D, b \times \Sigma T/T_D\}$$

a: weighting coefficient
b: weighting coefficient

That is, the reciprocal of a larger one of ($a \times \Sigma N/N_D$) and ($b \times \Sigma T/T_D$) serves as the evaluation value V.

By the calculation, a large evaluation value V of the battery 21 indicates a low past burden, in other words, the battery 21 can be preferentially utilized. When the battery 21 is used (for example, the battery 21 is utilized when the vehicle 2 does not travel), $\Sigma N$ and $\Sigma T$ increase and the evaluation value V decreases.

Note that the coefficients a and b can be adjusted based on which of the use count and the use time is heavily weighted. In the embodiment, both the use count and the use time are equally treated, so a=b=1.

Under these conditions,
an evaluation value (to be referred to as an evaluation value Va distinctively) for the battery 21a is
Va=10
an evaluation value (to be referred to as an evaluation value Vb distinctively) for the battery 21b is
Vb=16.667
an evaluation value (to be referred to as an evaluation value Vc distinctively) for the battery 21c is
Vc=9.375

The calculated evaluation values Va to Vc are stored in the memory 152 in association with vehicles 2a to 2c. This association is performed based on the identification numbers of the vehicles 2a to 2c in the embodiment, but may be alternatively/collaterally performed based on the identification numbers of the batteries 21a to 21c or based on another specific information.

In the embodiment, the evaluation value Vb is largest, the evaluation value Va is second largest, and the evaluation value Vc is smallest. The utilization order (descending order of priority of utilization) of the batteries 21a to 21c is an order of the battery 21b, the battery 21a, and the battery 21c. For example, when the demand for power in the facility 1 is higher than the supply and one battery 21 needs to be discharged, the battery 21b out of the batteries 21a to 21c becomes a discharge target. When two batteries 21 need to be discharged, the batteries 21a and 21b out of the batteries 21a to 21c become discharge targets. According to this utilization form, the use records of the batteries 21a to 21c are averaged, and the localization of the burden on the specific battery 21 can be substantially prevented.

When three batteries 21 need to be discharged, all the batteries 21a to 21c become discharge targets. According to the embodiment, first, the use histories of the batteries 21a to 21c are obtained (For example, S1100). Based on the use histories, the priority is decided to average the use records of the batteries 21a to 21c (for example, S1130). A utilization target, that is, a charge/discharge execution target is selected from the batteries 21a to 21c based on the priority (for example, S1160).

According to the embodiment, the burden is not localized on a specific battery (for example, 21a) in utilizing the batteries 21a to 21c, and the respective batteries 21a to 21c can be properly utilized. For example, the product life of each battery 21 can be prolonged, and any user of the service regarding the utilization of the battery 21 can be satisfied.

The priority is decided for each battery 21 based on the past use count $\Sigma N$ and use time $\Sigma T$ respectively calculated from the information INF_N representing the use count and the information INF_T representing the use time. The use records of the batteries 21a to 21c are averaged appropriately.

In the embodiment, the durability representing the upper limits (for example, upper limit values $N_D$ and $T_D$) of the use count and use time is set in advance for each battery 21, and the priority is further decided based on the durability. The replacement timings (or timings when the product life expires) of the respective batteries 21 can also be synchronized, which is advantageous for the management of the batteries 21.

Second Embodiment

FIGS. 7A and 7B show, as the second embodiment, an example in which the utilization of batteries 21 are continued from the above-described first embodiment. In the second embodiment, as shown in FIG. 7A,
as for a battery 21a,
  $\Sigma N$=130 times
  $\Sigma T$=960 hours
as for a battery 21b,
  $\Sigma N$=100 times
  $\Sigma T$=600 hours
as for a battery 21c,
  $\Sigma N$=160 times
  $\Sigma T$=800 hours
That is, the battery 21 was used for six hours by one time of utilization, and each of the batteries 21a and 21b were utilized 10 times ($\Sigma N$ increases by 10 times and $\Sigma T$ increases by 60 hours). Meanwhile, the battery 21c was not utilized.

Under these conditions,
an evaluation value Va for the battery 21a is
  Va=9.375
an evaluation value Vb for the battery 21b is
  Vb=15
an evaluation value Vc for the battery 21c is
  Vc=9.375

In the embodiment, the evaluation value Vb is largest, and the evaluation values Va and Vc are second largest (the evaluation value Va has reached the evaluation value Vc). When a plurality of evaluation values V are equal, priority is given to the vehicle 2 (vehicle 2a in this case) of a smaller/younger identification number. In this case, the utilization order (descending order of priority of utilization) of the batteries 21a to 21c is an order of the battery 21b, the battery 21a, and the battery 21c. When the two batteries 21 need to be further utilized, the batteries 21a and 21b out of the batteries 21a to 21c remain utilization targets.

FIG. 7B shows an example in which each of the batteries 21a and 21b were utilized one time (six hours) from the example of FIG. 7A. In this case, as for the battery 21a,
  $\Sigma N$=131 times
  $\Sigma T$=966 hours
as for the battery 21b,
  $\Sigma N$=101 times
  $\Sigma T$=606 hours
as for the battery 21c,
  $\Sigma N$=160 times
  $\Sigma T$=800 hours
Under these conditions,
the evaluation value Va for the battery 21a is
  Va=9.32
the evaluation value Vb for the battery 21b is
  Vb=14.85
the evaluation value Vc for the battery 21c is
  Vc=9.375

In the embodiment, the evaluation value Vb is largest, the evaluation value Vc is second largest, and the evaluation value Va is smallest (the relationship between the evaluation values Va and Vc is reversed). In this case, the utilization order (descending order of priority of utilization) of the batteries 21a to 21c is an order of the battery 21b, the battery 21c, and the battery 21a. When the two batteries 21 need to be further utilized, the batteries 21b and 21c out of the batteries 21a to 21c newly become utilization targets.

Third Embodiment

Figure 8:
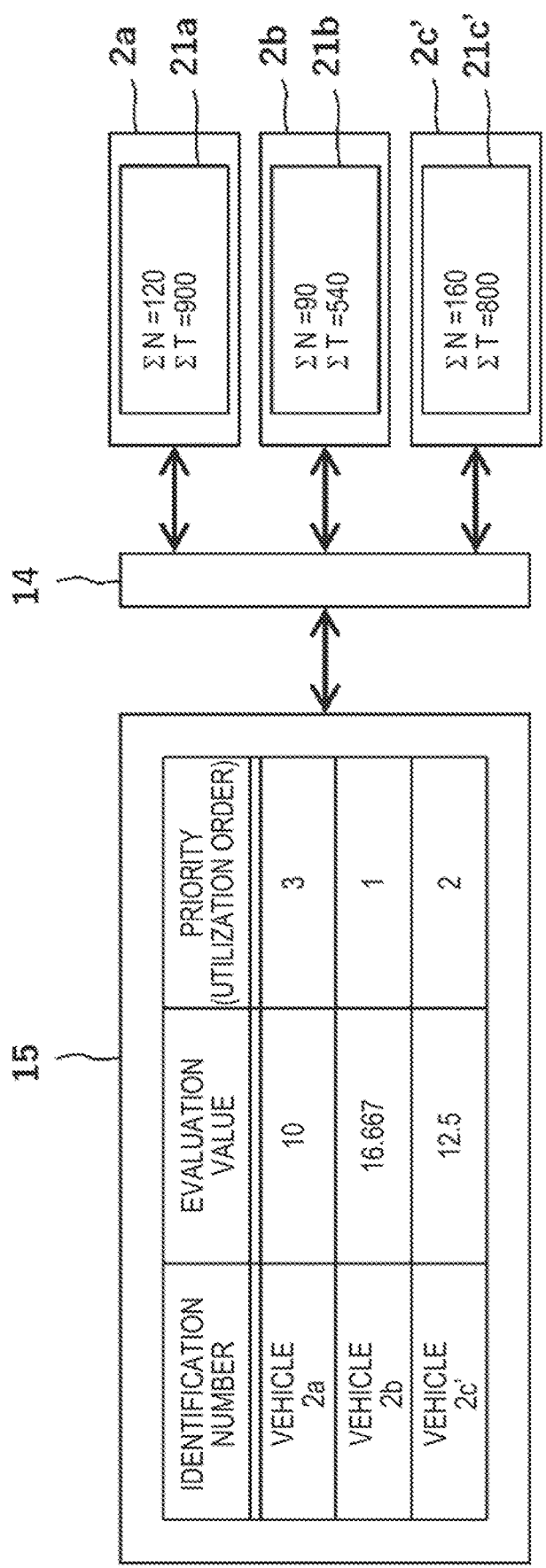
FIG. 8 is a view for explaining an example of the utilization form of a plurality of batteries.

FIG. 8 shows, as the third embodiment, an example in which a vehicle 2c' different in quality from a vehicle 2c is electrically connected to a facility 1 instead of the vehicle 2c. Note that vehicles 2a and 2b and corresponding batteries 21a and 21b are similar to those in the above-described first embodiment.

The vehicle 2c' includes a battery 21c'. The durability of the battery 21c', in this case, an upper limit value $N_D'$ of the use count and an upper limit value $T_D'$ of the use time are, for example,
  $N_D'$=2000 times
  $T_D'$=12000 hours
A use count $\Sigma N'$ and use time $\Sigma T'$ of the battery 21c' are
  $\Sigma N'$=160 times
  $\Sigma T'$=800 hours
In this case, an evaluation value (to be referred to as an evaluation value Vc') for the battery 21c' can be calculated by $$1/Vc'=\text{Max}\{a \times \Sigma N'/N_D', b \times \Sigma T'/T_D'\}$$

Under these conditions,
an evaluation value Va for the battery 21a is
  Va=10
an evaluation value Vb for the battery 21b is
  Vb=16.667
the evaluation value Vc' for the battery 21c' is
  Vc'=12.5

In the embodiment, the evaluation value Vb is largest, the evaluation value Vc' is second largest, and the evaluation value Va is smallest. In this case, the utilization order (descending order of priority of utilization) of the batteries 21a to 21c' is an order of the battery 21b, the battery 21c', and the battery 21a. When the two batteries 21 need to be utilized, the batteries 21b and 21c' out of the batteries 21a to 21c' become utilization targets.

According to the embodiment, even when a battery (21c' in this case) having different specifications coexists in the utilizable batteries 21, the priority can be decided according to procedures similar to those in the first to second embodiments while maintaining the fairness between the batteries 21.

In the above example, the priority is decided by giving attention to the differences ($N_D<N_D'$, $T_D<T_D'$) in durability between the batteries 21. However, when the batteries 21 have the same durability but the types of the vehicles 2 are different, the priority may be decided based on the vehicle type. For example, the priority may be decided by calculating the evaluation value V (for example, by correcting the use record and/or durability) on the assumption that, even if the batteries 21 of two vehicles 2 different in brand have the same durability, they are different in durability. This means that the brand power of the vehicle 2 itself can be exploited in the utilization of the battery 21.

Fourth Embodiment

In the above-described first embodiment, the use records of the batteries 21a to 21c are so averaged as not to localize the burden on the specific battery 21. The fourth embodiment is different from the first embodiment in that the use records are averaged within a predetermined period.

Figure 9:
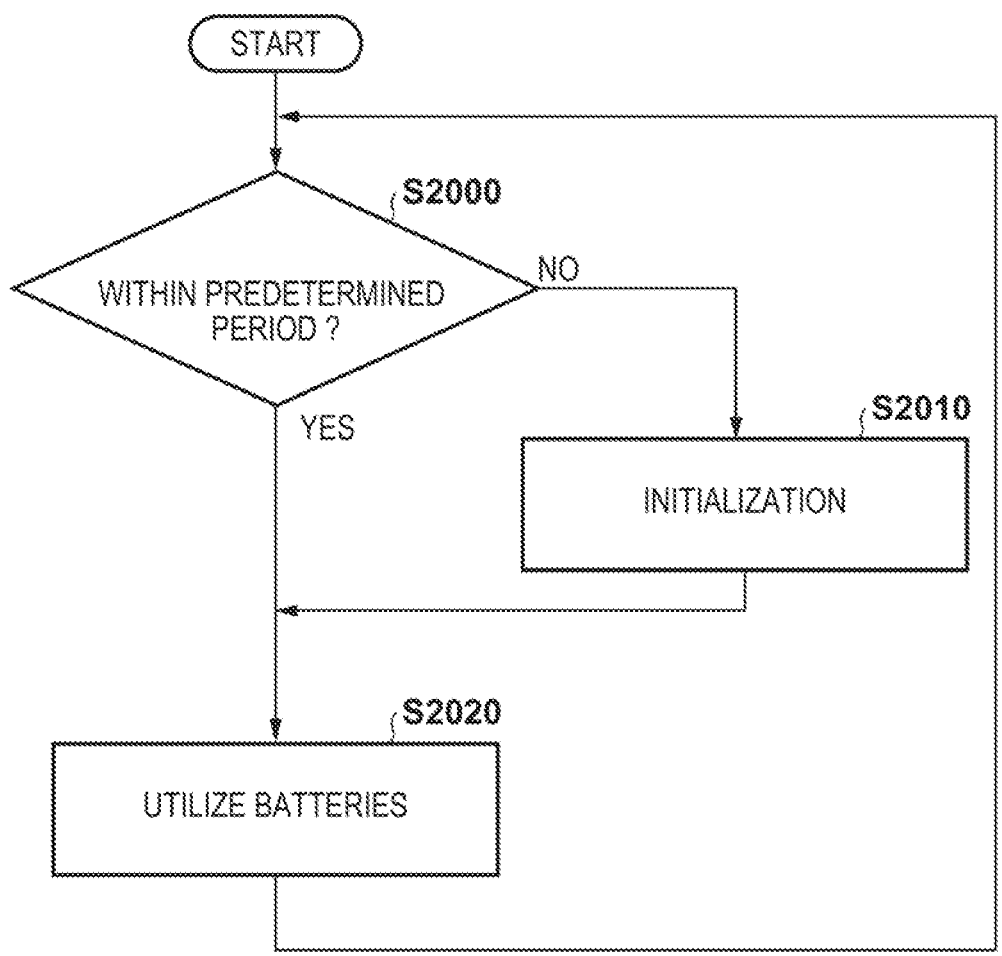
FIG. 9 is a flowchart for explaining an example of the utilization form of a plurality of batteries.

FIG. 9 is a flowchart showing a utilization method according to the fourth embodiment. The general outline is to initialize the use record at a preset timing such as the end or beginning of the month or the end or beginning of the year.

In S2000, it is determined whether the day of determination falls within a predetermined period. In this case, the predetermined period is one month, and it is determined in S2000 whether the day of determination is the end of the month (or the next day is the first day). If the day of determination falls within the predetermined period, the process advances to S2020; otherwise (the day of determination is the end of the month), to S2010.

In S2010, the use history of each battery 21 is initialized to initialize the above-mentioned use count ΣN and use time ΣT to initial values (for example, 0). If the use records of the batteries 21 are different at the time of initialization, the initial values can also be corrected, details of which will be described later.

In S2020, the batteries 21 are utilized as described with reference to FIGS. 2 to 4, and then the process returns to S2000. This flowchart can be continuously performed while, for example, the service regarding the utilization of the battery 21 is available.

FIG. 10 shows the use histories of respective batteries 21a to 21c in a predetermined period based on the flowchart of FIG. 9. In this case, k is an integer of 1 or more (1, 2, . . . ), and FIG. 10 shows the use count ΣN and the use time ΣT at the time of the kth utilization. For descriptive convenience, all the batteries 21a to 21c are assumed to have similar specifications. That is, the durabilities ($N_D$ and $T_D$) of the batteries 21a to 21c are assumed to be equal between the batteries 21a to 21c. In addition, the two batteries 21 are assumed to be used for six hours by one time of utilization.

For example, for k=1 (first utilization), the batteries 21a to 21c are utilized for the first time. For all the batteries 21a to 21c,
ΣN=0
ΣT=0
In this case, the evaluation values Va to Vc are equal to each other, and two batteries 21 (batteries 21a and 21b in this case) smaller/younger in identification number are utilized preferentially.

For example, for k=2 (second utilization), the battery 21c is utilized for the first time, whereas the batteries 21a and 21b have already been utilized once. As for the batteries 21a and 21b,
ΣN=1
ΣT=6

As for the battery 21c,
ΣN=0
ΣT=0
In this case, the evaluation value Vc is largest, and the evaluation values Va and Vb are second largest and equal to each other. Therefore, the battery 21c and either (battery 21a in this case) of the batteries 21a and 21b smaller/younger in identification number are utilized preferentially.

For example, for k=3 (third utilization), the batteries 21b and 21c have been utilized once, whereas the battery 21a has been used twice.
As for the battery 21a,
ΣN=2
ΣT=12
As for the batteries 21b and 21c,
ΣN=1
ΣT=6
In this case, the evaluation values Vb and Vc are largest, and the evaluation value Va is smallest. Hence, the batteries 21b and 21c are utilized preferentially.

In this manner, the utilization of the batteries 21a to 21c is sequentially repeated. In the embodiment, at the end of the month, as for the batteries 21a and 21b,
ΣN=5
ΣT=30
as for the battery 21c,
ΣN=4
ΣT=24
Because of the end of the month (see S2010), the use history of each battery 21 is initialized to initialize the use count ΣN and the use time ΣT to initial values (for example, 0). In initialization, the batteries 21a and 21b (ΣN=5, ΣT=30) and the battery 21c (ΣN=4, ΣT=24) are different in use record. The initial values are preferably corrected based on the difference. For example, as shown in FIG. 10, the initial values of the use count ΣN and use time ΣT can be corrected into
as for the batteries 21a and 21b,
ΣN=1
ΣT=6
as for the battery 21c,
=0
ΣT=0
As another example,
as for the batteries 21a and 21b,
=0
ΣT=0
as for the battery 21c,
ΣN=−1
ΣT=−6
According to the embodiment, the priority is so decided as to average the use records of the batteries 21 within a predetermined period. A user can start the use of the service (service regarding the utilization of the battery 21) at a timing different from that of another user. According to the embodiment, the fairness between the users can be maintained. When the predetermined period has elapsed, the use records of the batteries 21 are initialized (S2010). At this time, if the use record is different between the batteries 21, the initial values of the use records to be initialized can be corrected based on the difference (see FIG. 10). This can properly maintain the fairness between the users.

(Others)

In the above-described first to fourth embodiments, the charge/discharge management apparatus 15 receives information (for example, information representing the use record) about the battery 21 from the vehicle 2 by communication with the vehicle 2 electrically connected to the facility 1 (see S1100 in FIG. 2). The vehicle 2 includes, for example, in the controller 25, a memory for recording the use history of the battery 21 and an external communication interface for transmitting the use history to the charge/discharge management apparatus 15. The charge/discharge management apparatus 15 can be relatively easily used for the vehicle 2. The user of the vehicle 2 can start, for example, the use of the service regarding the utilization of the battery 21 at a timing he/she wants.

According to the arrangement of the vehicle 2, the memory of the controller 25 can record, as the use history, a utilization form of the battery 21 by the charge/discharge management apparatus 15, and a use form of the battery 21 for another purpose. That is, a use form of the battery 21 while it is not electrically connected to the facility 1 (for example, the use of the battery 21 when the vehicle 2 travels, or the utilization of the battery 21 in a facility different from the facility 1) can also be recorded as the use history.

The use history referred to by the charge/discharge management apparatus 15 may be limited to utilization while the vehicle 2 is electrically connected to the facility 1. That is, the use form of the battery 21 while the vehicle 2 is not electrically connected to the facility 1 may not substantially influence the utilization of the battery 21 while the vehicle 2 is electrically connected to the facility 1, so that the fairness to another battery 21 is ensured in only the utilization of the battery 21 in the facility 1. In this case, a use form of the battery 21 while the vehicle 2 is not electrically connected to the facility 1 may not be recorded as the use history in the memory of the controller 25.

In the above description, each element is referred to by a name associated with its function to facilitate understanding. However, each element is not limited to one having, as a main function, the contents described in the embodiment, but may be one accessorily having the contents.

Summary of Embodiments

The first aspect concerns a charge/discharge management apparatus (for example, 15). The charge/discharge management apparatus for executing charge/discharge of a battery (for example, 21) of a vehicle (for example, 2) electrically connected to a facility (for example, 1) comprises an obtaining unit (for example, S1100) for obtaining use histories of a plurality of batteries corresponding to a plurality of vehicles electrically connected to the facility, and a selection unit (for example, S1160) for selecting a battery subjected to execution of charge/discharge from the plurality of batteries based on priority decided from the use histories. When utilizing a plurality of batteries, as described in the embodiment, the burden is not localized on a specific battery and the plurality of batteries can be properly utilized. This can prolong the product life of each battery, and any user can be satisfied when using a service regarding the utilization of the battery.

In the second aspect, the charge/discharge management apparatus further comprises a decision unit (for example, S1130) for deciding the priority, and the decision unit decides the priority to average use records of the plurality of batteries. Accordingly, the first aspect can be implemented appropriately.

In the third aspect, the decision unit decides the priority based on past use counts (for example, INF_N and $\Sigma N$) and use times (for example, INF_T and $\Sigma T$) of the plurality of batteries. The second aspect can therefore be implemented appropriately.

In the fourth aspect, a durability (for example, $N_D$ and $T_D$) representing upper limits of the use count and use time is set in advance for each of the plurality of batteries, and the decision unit decides the priority further based on the durabilities of the plurality of batteries. The third aspect can be implemented appropriately. The replacement timings of the respective batteries can be sometimes synchronized, which is advantageous for the management of the batteries.

In the fifth aspect, the durability is set based on a type of a vehicle including the battery. Although the durability of the battery directly depends on the quality of the battery itself in general, the brand power of the vehicle itself can also be exploited for the utilization of the battery according to the fifth aspect.

In the sixth aspect, the decision unit decides the priority to average the use records of the plurality of batteries within a predetermined period. For example, a user can start the use of the service at a timing different from that of another user. According to the sixth aspect, the fairness between the users at that time can be maintained.

In the seventh aspect, the charge/discharge management apparatus further comprises an initialization unit (for example, S2010) for initializing the use record when the predetermined period has elapsed. Thus, the sixth aspect can be implemented appropriately.

In the eighth aspect, when the use records of the plurality of batteries within the predetermined period have a difference in initializing the use records, the initialization unit corrects, based on the difference, initial values of the use records to be initialized (for example, FIG. 10). The seventh aspect can be implemented appropriately.

The ninth aspect concerns a vehicle (for example, 2). The vehicle is comprising a battery capable of executing charge/discharge by a charge/discharge management apparatus (for example, 15), wherein the charge/discharge management apparatus can obtain use histories of a plurality of batteries corresponding to a plurality of electrically connected vehicles and select a battery subjected to execution of charge/discharge from the plurality of batteries based on priority decided from the use histories, and the vehicle includes a recording unit (for example, 25 and a memory) for recording the use histories of the batteries, and a transmission unit (for example, 25 and an external communication interface) for transmitting the use histories to the charge/discharge management apparatus. The above-described charge/discharge management apparatus can be used in the utilization of the batteries of various electric vehicles, and the owner of such a vehicle can properly use the service at a timing he/she wants.

In the 10th aspect, the recording unit records, as the use history, the charge/discharge by the charge/discharge management apparatus, and a use form of the battery for another purpose. For example, use forms of the battery on various scenes such as the use of the battery when the vehicle travels, and the utilization of the battery in another facility are recorded as the use history. The first aspect can therefore be implemented properly.

The invention is not limited to the foregoing embodiments, and various variations/changes are possible within the spirit of the invention.

What is claimed is:

1. A charge/discharge management apparatus for executing charge/discharge of a battery of a vehicle electrically connected to a facility, comprising:
   an obtaining unit for obtaining use histories of a plurality of batteries corresponding to a plurality of vehicles electrically connected to the facility;

a selection unit for selecting a battery subjected to execution of charge/discharge from the plurality of batteries based on priority decided from the use histories;

a decision unit for deciding the priority to average use records of the plurality of batteries, wherein the decision unit decides the priority to average the use records of the plurality of batteries within a predetermined period; and an initialization unit for initializing the use record when the predetermined period has elapsed, wherein when the use records of the plurality of batteries within the predetermined period have a difference in initializing the use records, the initialization unit corrects, based on the difference, initial values of the use records to be initialized.

2. A vehicle comprising a battery capable of executing charge/discharge by the charge/discharge management apparatus according to claim 1, wherein the vehicle includes a recording unit for recording the use histories of the batteries, and a transmission unit for transmitting the use histories to the charge/discharge management apparatus, wherein the recording unit records, as the use history, the charge/discharge by the charge/discharge management apparatus, and a use form of the battery for another purpose.

3. The apparatus according to claim 1, wherein the decision unit decides the priority based on past use counts and use times of the plurality of batteries.

4. The apparatus according to claim 3, wherein a durability representing upper limits of the use count and use time is set in advance for each of the plurality of batteries, and the decision unit decides the priority further based on the durabilities of the plurality of batteries.

5. The apparatus according to claim 4, wherein the durability is set based on a type of a vehicle including the battery.

* * * * *